United States Patent
Horton et al.

(10) Patent No.: US 7,656,810 B2
(45) Date of Patent: Feb. 2, 2010

(54) SYSTEM AND METHOD FOR MONITORING AND REACTING TO PEER-TO-PEER NETWORK METRICS

(75) Inventors: Noah Horton, Sammamish, WA (US); Brian R. Lieuallen, Redmond, WA (US); Geogy A. Samuel, Kirkland, WA (US); Sandeep K. Singhal, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 488 days.

(21) Appl. No.: 11/089,894

(22) Filed: Mar. 25, 2005

(65) Prior Publication Data

US 2006/0215575 A1      Sep. 28, 2006

(51) Int. Cl.
*H04J 3/14* (2006.01)
(52) U.S. Cl. .................. 370/242; 726/22; 709/224
(58) Field of Classification Search ........... 370/231, 370/252, 254, 400, 242; 709/223, 220, 224; 726/22
See application file for complete search history.

(56) References Cited

U.S. PATENT DOCUMENTS

| | | | |
|---|---|---|---|
| 4,874,963 A | 10/1989 | Alspector | |
| 5,293,457 A | 3/1994 | Arima et al. | |
| 6,725,281 B1 | 4/2004 | Zintel et al. | |
| 6,779,004 B1 | 8/2004 | Zintel | |
| 6,892,230 B1 | 5/2005 | Gu et al. | |
| 6,990,616 B1 * | 1/2006 | Botton-Dascal et al. | 714/715 |
| 2002/0027569 A1 | 3/2002 | Manni et al. | |
| 2002/0112058 A1 | 8/2002 | Weisman et al. | |
| 2002/0143989 A1 | 10/2002 | Huitema et al. | |
| 2003/0055892 A1 | 3/2003 | Huitema et al. | |
| 2003/0056093 A1 | 3/2003 | Huitema et al. | |
| 2003/0056094 A1 | 3/2003 | Huitema et al. | |
| 2003/0097425 A1 | 5/2003 | Chen | |
| 2003/0117433 A1 | 6/2003 | Milton et al. | |
| 2003/0204742 A1 | 10/2003 | Gupta et al. | |
| 2004/0003068 A1 * | 1/2004 | Boldman et al. | 709/223 |
| 2004/0111469 A1 | 6/2004 | Manion et al. | |
| 2004/0148333 A1 | 7/2004 | Manion et al. | |
| 2004/0249907 A1 | 12/2004 | Brubacher et al. | |
| 2004/0255029 A1 | 12/2004 | Manion et al. | |
| 2004/0260800 A1 | 12/2004 | Gu et al. | |

(Continued)

OTHER PUBLICATIONS

Hughes et al., A Framework for Testing Distributed Systems, Proceedings of the Fourth International Conference on Peer-to-Peer Computing (P2P'04) 2004 IEEE.*

(Continued)

*Primary Examiner*—Kevin C Harper
*Assistant Examiner*—Henry Baron
(74) *Attorney, Agent, or Firm*—Marshall, Gerstein & Borun LLP

(57) ABSTRACT

The overall health of a peer-to-peer network may be inferred from statistics gathered and analyzed pertaining to individual node and node-to-node performance within the peer-to-peer network. When used with simulations for development or testing, the health statistic may be used instead of or to supplement standard regression testing to determine whether or not changes made improve system performance. When used with live peer-to-peer networks, the health statistic may provide a real-time view into network performance. Such a view may be used to adjust peer-to-peer network topology or to isolate underperforming or malicious nodes.

8 Claims, 4 Drawing Sheets

U.S. PATENT DOCUMENTS

| | | | |
|---|---|---|---|
| 2005/0022210 A1 | 1/2005 | Zintel et al. | |
| 2005/0052998 A1* | 3/2005 | Oliver et al. | 370/231 |
| 2005/0074018 A1 | 4/2005 | Zintel et al. | |
| 2005/0097503 A1 | 5/2005 | Zintel et al. | |
| 2005/0157659 A1 | 7/2005 | Huitema | |
| 2006/0047809 A1* | 3/2006 | Slattery et al. | 709/224 |
| 2006/0184714 A1* | 8/2006 | Dang et al. | 711/100 |
| 2009/0030969 A1* | 1/2009 | Dutta et al. | 709/201 |

OTHER PUBLICATIONS

Waldbusser et al RFC 1757 Remote Network Monitoring Management Information Base, Feb. 1995.*

"Explorations in Parallel Distributed Processing," McClelland et al., The Massachusetts Institute of Technology, 1988.

"Distributed hash table," http://en.wikipedia.org/wiki/Distributed_hash_table (Mar. 2006).

Dabek, F., et al., "Vivaldi: A Decentralized Network Coordinate System," SIGCOMM 2004, Aug 2004.

Ng, T.S., et al., "Predicting Internet Network Distance with Coordinates-Based Approaches," INFOCOM'02, New York, NY, Jun. 2002.

"Genetic algorihm," http://www.google.com/search?sourceid-navclient&ie-UTF-8&rls-GGLG,GGLG:2005-3 (Mar. 2006).

Ng, T.S., et al., "Global Network Positioning: A New Approach to Network Distance Prediction," Student Poster, SIGCOMM'01, San Diego, CA Aug. 2001.

"Artificial Neural Network," Wikipedia Encyclopedia, http://en.wikipedia.org/wiki/Artificial_neural_network (Mar. 14, 2006).

Ng, T.S., et al., "A Network Positioning System for the Internet," USENIX Annual Technical Conference 2004, Boston, MA, Jun. 2004.

Zhang et al. "Brushwood: Distributed Trees in Peer-to-Peer Systems" (Mar. 2006).

Ng, T.S., et al., "Towards Global Network Positioning," Extended Abstract, ACM SIGCOMM Internet Measurement Workshop 2001, San Francisco, CA, Nov. 2001.

"Latency," http://whatis.techtarget.com/definition/0,,sid9_gci212456,00.html (Mar. 2006).

Costa et al. "PIC: Practical Internet Coordinates for Distance Estimation," ICDCS 2004 (Mar. 2004).

Cox, R., et al., "Practical, Distributed Network Coordinates," HotNets Workshop, 2003.

"Neural Network," Wikipedia Encyclopedia, http://en.wikipedia.org/wiki/Neural_network (Mar. 16, 2006).

"Genetic algorithm," http://en.wikipedia.org/wiki/Genetic_algorithm (Mar. 2006).

"The Cable Guy—Nov. 2003: Windows Peer-to-Peer Networking," Microsoft Technet, http://www.microsoft.com/technet/community/columns/cableguy/cg1103.mspx.

* cited by examiner

SYSTEM AND METHOD FOR MONITORING AND REACTING TO PEER-TO-PEER NETWORK METRICS

TECHNICAL FIELD

This application is generally in the field of distributed network management, more particularly to a system and method for monitoring and reacting to peer-to-peer network metrics.

BACKGROUND

Traditionally, when simulating or testing data systems, a proposed change to the system is installed and a series of tests, sometimes called regression tests are performed to determine if the data system with the change meets the design target and at the same time is compatible with previous versions of the data system. Regression testing tends to be exhaustive and binary. That is, a set of test cases are designed and developed. Each test case is performed and the results noted. Testing continues until either the first test fails or a catalog of failed tests is developed, at which time the testing is stopped and the data system is referred back to the development team.

In large scale distributed systems, changes made to portions of the system, as well as incremental changes made to each element of the system, may not be exhaustively testable, nor may the impact of a change be apparent from a given test case suite. Therefore, a system and method for monitoring and reacting to peer-to-peer network metrics is needed.

SUMMARY

For a large distributed data system, such as peer-to-peer network, a conventional regression test of node performance may not reveal the overall impact of a change on the distributed system. In distributed network systems, a series of measurements may be made to determine individual node and node-to-node performance. Such metrics may include address resolution success rate, time to resolve addresses, percent cache accuracy, etc. Even the individual metrics may not reveal subtle differences in network performance due to statistical changes in the peer-to-peer network fabric and loading. The raw data of results of simulations of distributed networks having millions of nodes may not be comprehensible to human observers.

In such cases, it may be advantageous to aggregate node and node-to-node metrics into an overall health statistic. The health statistic may then be used to monitor the nature of changes to the distributed network when simulating during development. Additionally, the health statistic may be useful in monitoring performance of both the overall distributed network and portions of the distributed network, sometimes referred to as clouds. In development, the health statistic may be used to determine when a change to the distributed network actually results in an improvement, or whether the change, through design defect or side-effect, caused a degradation in overall performance. In live systems, nodes may be instrumented to report metric data to one or more monitoring points that are aggregated to provide the health statistic. An analysis of the health statistic for the global cloud or smaller site and link clouds may reveal trouble spots and allow the system to automatically take steps to heal the cloud.

DETAILED DESCRIPTION OF VARIOUS EMBODIMENTS

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
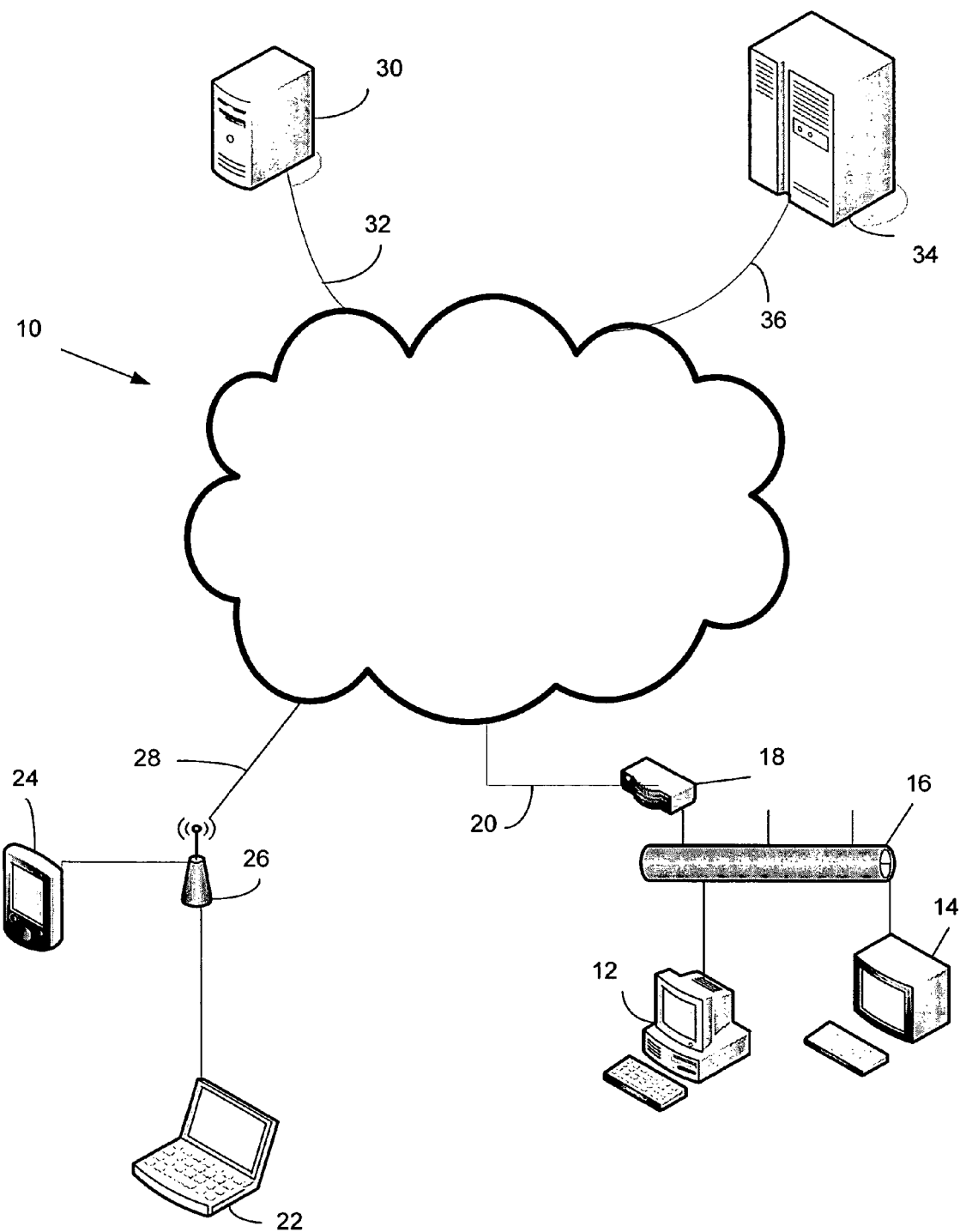
FIG. 1 is a simplified and representative block diagram of a computer network.

FIG. 1 illustrates a network 10 that may be used to support a peer-to-peer network. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36.

Figure 2:
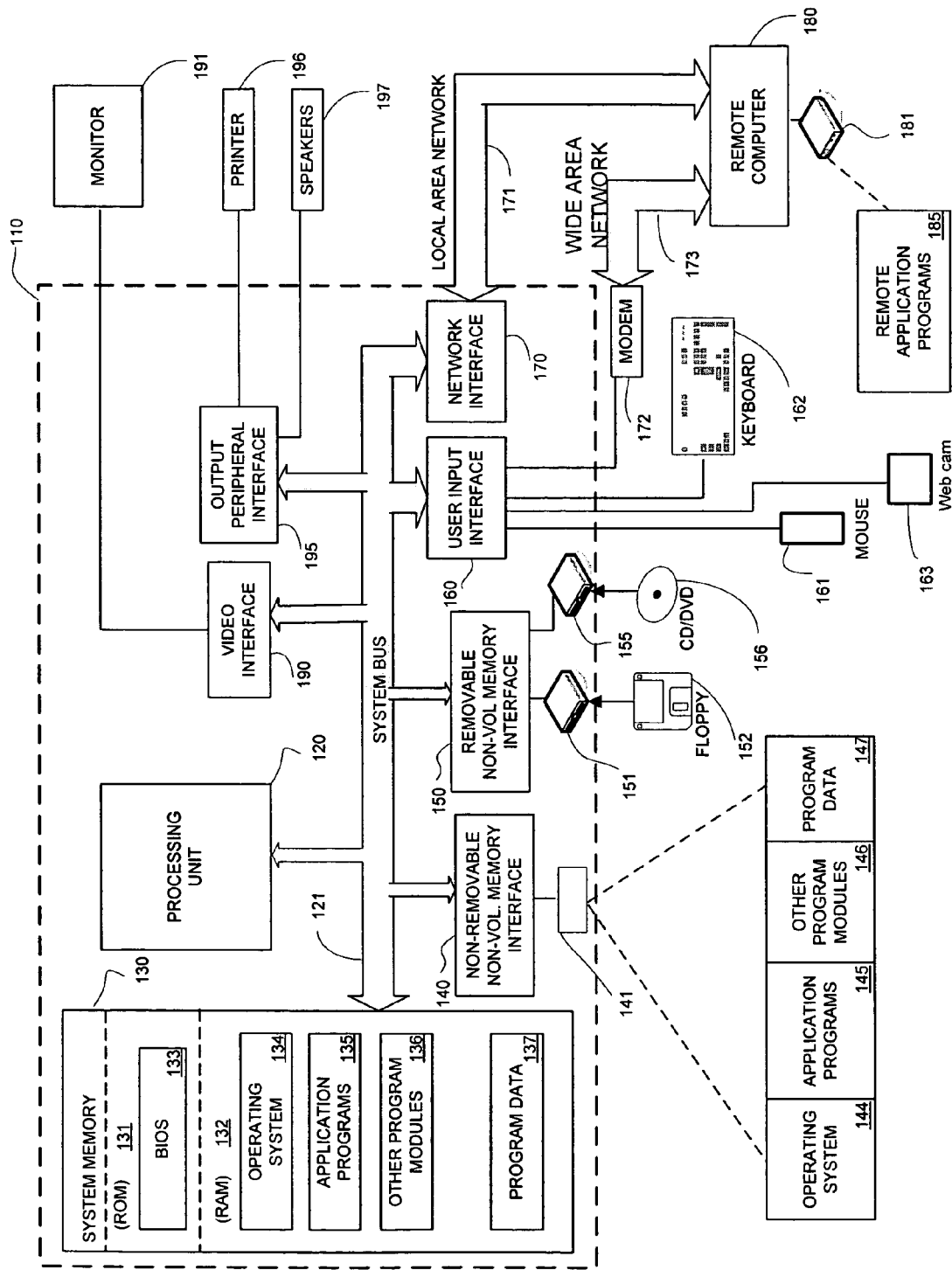
FIG. 2 is a simplified and representative block diagram of a computer.

FIG. 2 illustrates a computing device in the form of a computer 110 that may be connected to the network 10 and may participate in a peer-to-peer network. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Another input device may be a camera for sending images over the Internet, known as a web cam 163. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Figure 3:
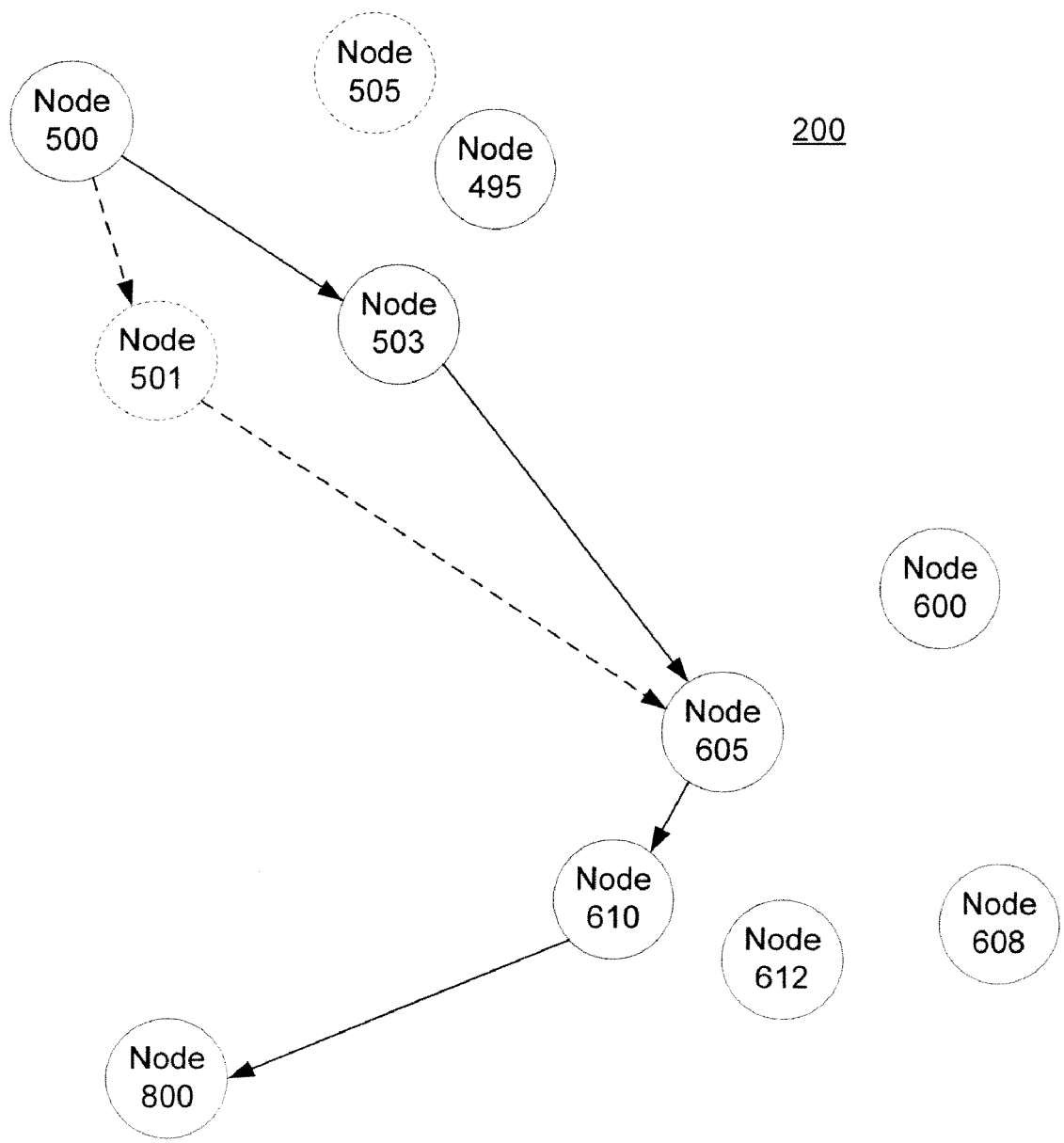
FIG. 3 is a simplified and representative block diagram of a peer-to-peer network.

FIG. 3 is a simplified and representative block diagram of nodes participating in a peer-to-peer network 300. The peer-to-peer network 300 may be a point-to-point peer-to-peer network, with communication between nodes on a one-to-one basis. The peer-to-peer network 300 may also be a multicast peer-to-peer network, with communication on a one-to-many basis. Each node may have a cache of known other nodes. In general, nodes are likely to have more information about nodes closer to them than nodes farther away, for example, by number. When a first node searches for another node, it may first ask neighbors numerically closer to the destination if they have data regarding the target node. If the neighbor node does, it may be asked to forward the message or request. To illustrate using FIG. 3, node 500 is trying to connect to node 800. Node 500 may first ask node 503 to forward a message on its behalf. Node 503 does not know about node 800 but has in its cache an entry for node 605, which has a closer peer-to-peer identifier to node 800. Node 605 may then forward the message to node 610. Node 610 has a cache entry for node 800 and forwards the message to the ultimate destination. In this example, each node was progressively closer to the destination node. While this is not always the case, and some retries may occur, this is sufficient to illustrate the basic routing scheme. Nodes 495, 600, 608 and 612 did not participate in this example routing. Nodes 501 and 505 are discussed below. On a small scale this distributed system is relatively simple to construct and maintain. However, when scaled to millions or hundreds of millions of nodes, the performance of the network fabric may become difficult to evaluate when making changes to the hardware and software of the distributed system.

Unlike prior art simulation systems, simulation and testing of a large distributed system such as a peer-to-peer network may not use standard test suites and go/no-go testing. A fix or patch made to routing and/or network management routines may have both local and global impact. The use of instrumentation in the simulated nodes, or a subset of the simulated nodes, may allow generation of a health statistic that allows evaluation of high level performance of the global cloud as well as site and link clouds.

A large peer-to-peer network may be viewed from several perspectives. One view is a physical locale, where nodes and their performance in the peer-to-peer network are viewed with respect to their actual geographic location. The peer-to-peer network can also be viewed as a network locale, that is, nodes organized by Internet service provider, or router connectivity. Nodes in the same network locale are likely to be geographically dispersed and physically commingled with nodes of other network locales. A third view of peer-to-peer network organization may be viewed as a logical locale, that is, by peer-to-peer network identification number. Since the identification numbers in some peer-to-peer networks are related to hashes of the service name, they are unrelated to physical and network locales. The result is that the logical locale view of a peer-to-peer network is different still from the physical and network locales.

By measuring peer-to-peer network performance, either during simulation or during live operation, health statistics can be generated according to the locale of interest. That is, by correlating health statistics according to one of the locales described above, system issues may be identified as corresponding to one or more elements of a particular locale. During development and simulation, the health statistic generated using simulated locale data may pinpoint vulnerabilities or confirm routing and management strategies. Analysis by locale gives developers and administrators a more reliable way of regression testing changes to the peer-to-peer network as well as comparative evaluation of improvements. When a change, for example, a code change to a name service, is introduced and the health statistic improves, the change may be kept. When the change is introduced and the health statistic degrades, the change may be rolled back and the system reverted to its former configuration or code set. These changes may be introduced and monitored for a given locale or at the system level.

To extend the example in the live case, instrumentation may be added to several nodes, either geographically or logically. In this example, nodes 500, 600, and 800 may be instrumented. Statistics may be reported to a controller within an existing network node, for example, node 600, or may be coupled to the peer-to-peer network without being a participant in routing peer-to-peer network traffic.

For the sake of example, say that node 503 exhibits a performance problem. There may be many causes of performance problems. Node 503 may have gone off-line and the neighbors may not have cleaned it from their caches, therefore packets sent to it are lost. Node 503 may be busy and not managing its queue, so traffic is delayed or discarded. Another reason may be that node 503 is malicious and is deliberately delaying or dumping packets. Other reasons may exist, but these are sufficient for illustration.

Metrics supplied by the instrumented nodes, particularly neighboring nodes 500 and 600 may begin to report that node 503 is not responding and queue times are building in that part of the network. The controller, in this case, node 600, may register new nodes 501 and 505 in the network to act to fill in around the slow or failed node 503. By specifically targeting new nodes 501 and 505 in the number space around node 503, the neighboring nodes, e.g. nodes 500 and 495 may both discover and use the new nodes 501, 505 for routing and requesting data. Node 503, if present, may still be addressable and may respond if addressed. However, neighboring nodes, that is, nodes still caching the node 503 address are not likely to select node 503 as a first choice because the intervening nodes have built up the routing support for the region. In this manner, unhealthy or even malicious nodes may be surrounded and their impact on the peer-to-peer network may be reduced or eliminated.

Since the nodes 501 and 505 were specifically registered in that region because of performance degradation, they may be instrumented as well. This instrumentation may be more focused to particular problem diagnostics and may be more sophisticated, i.e. more resource intensive, than routine, widely distributed, instrumentation. The additional instrumentation in the region may allow further refinement of the diagnosis of the problem and aid in the repair of the problem or problems. Specific nodes may be more closely monitored to determine their root cause problems or if they appear malicious. If and when the health statistics indicate that node 503 is healthy, for example, its queues clear up and routing performance is improved, the nodes 501 and 505 may be removed.

Figure 4:
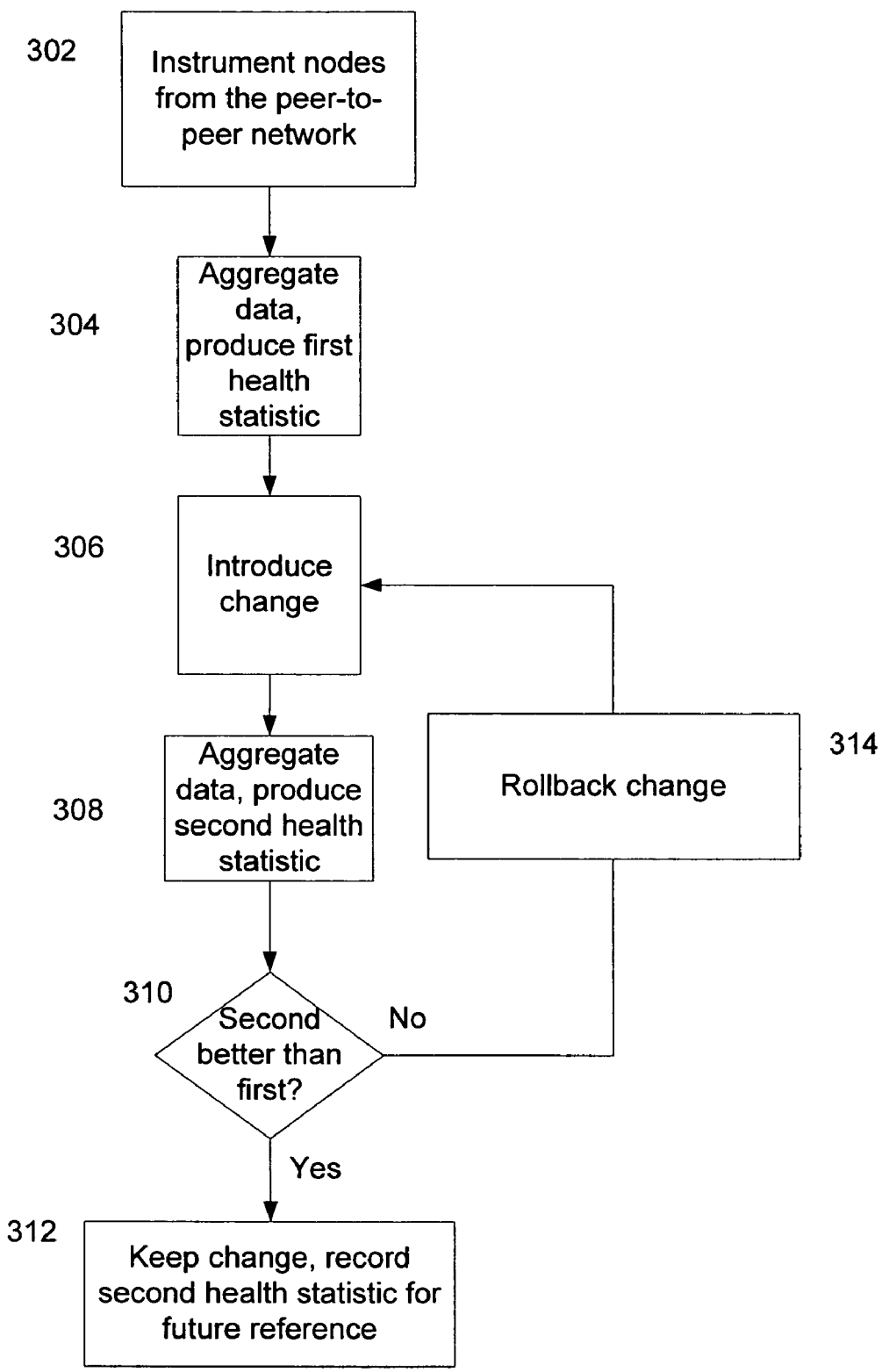
FIG. 4 is a flow chart depicting a method of managing a peer-to-peer network.

Referring to FIG. 4, a flow chart depicting a method of managing a peer-to-peer network is discussed and described. A peer-to-peer network, such as peer-to-peer network 200 of FIG. 3 may be composed of computers, such as computer 110 of FIG. 2, in a network such as network 10 of FIG. 1. For the purpose of this disclosure, the peer-to-peer network may also be a simulation of the computers and network interconnects required for such a simulation. In either case, nodes may be instrumented 302, that is, configured to measure and report data statistics related to internal and external performance. Some exemplary measurements may include address resolution success rate, time to resolve addresses, and percent cache accuracy. As data statistics are reported, for example, to node 600 in the live case, the measurement data are aggregated 304 into a health statistic. A first set of metrics and a corresponding health statistic may be used as a baseline measurement.

A change may then be introduced 306, such as a change to one or more nodes peer-to-peer network client or a change to a network component, such as a server supporting name resolution. The change may be to the physical topology of the peer-to-peer network, for example, adding or removing physical nodes. Alternatively, the change may be to the logical structure of the peer-to-peer network, for example, registering nodes in a particular cloud. The peer-to-peer network is then operated and metric data is again collected 308, as before. Since the operation of a live network can virtually never be duplicated exactly, and in fact, even a simulation with a realistic amount of randomness will not exactly duplicate operation, the metric data may likely vary from the previous data taken. A second health statistic may be produced 308 from the aggregated data. A comparison of the first and second health statistics may be made 310. If the second health statistic is better than the first, it may be implied that the peer-to-peer network performance has improved. The yes branch from block 310 may be taken and the change kept in place, while the second health statistic may be recorded 312 for future reference.

If, at block 310, the second health statistic was worst than the first, or in some cases even the same, the no branch from block 310 may be taken and the change rolled back 314 and the peer-to-peer network restored to its former condition. The execution may then return to block 306 where another change may be introduced and the process repeated.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. In a peer-to-peer network comprising a plurality of nodes, a method of maintaining the peer-to-peer network comprising:

instrumenting a set of the plurality of nodes;

collecting performance statistics from the set of the plurality of nodes;

aggregating the performance statistics to generate a health statistic;

comparing the health statistic to a threshold level health statistic;

registering at least one new node into the peer-to-peer network when the health statistic is below the threshold; and identifying a slow or failing node in the peer-to-peer network based on the health statistic, and wherein registering the at least one new node comprises registering the at least one new node in a vicinity of the slow or failing node.

2. The method of claim 1, wherein the health statistic corresponds to a peer-to-peer locale comprising a subset of peer-to-peer nodes in the peer-to-peer network, the subset including a plurality of peer-to-peer nodes in the peer-to-peer network related by one of a physical locale, a network locale and a logical locale.

3. A controller adapted for peer-to-peer network administration comprising:

a processor for executing code;

a port for data communications coupled to the processor;

a memory storing executable code coupled to the processor, the executable code comprising:

a module for instrumenting a set of a plurality of nodes in a peer-to-peer network;

a module for collecting performance statistics from the set of the plurality of nodes;

a module for aggregating the performance statistics to generate a health statistic;

a module for comparing the health statistic to a threshold level health statistic;

a module for registering at least one new node into the peer-to-peer network when the health statistic is below the threshold; and a module for identifying a slow or failing node in the peer-to-peer network based on the health statistic, and wherein registering the at least one new node comprises registering the at least one new node in a vicinity of the slow or failing node.

4. The method of claim 1, further comprising removing the at least one new node when an updated health statistic indicates the slow or failing node is improved.

5. The method of claim 1, further comprising instrumenting the at least one new node.

6. The controller of claim 3, wherein the health statistic corresponds to a peer-to-peer locale comprising a subset of peer-to-peer nodes in the peer-to-peer network, the subset including a plurality of peer-to-peer nodes in the peer-to-peer network related by one of a physical locale, a network locale and a logical locale.

7. The controller of claim 3, wherein the executable code further comprises a module for removing the at least one new node when an updated health statistic indicates the slow or failing node is improved.

8. The controller of claim 3, wherein the executable code further comprises a module for instrumenting the at least one new node.

* * * * *